(12) United States Patent
Schlansker et al.

(10) Patent No.: US 8,811,398 B2
(45) Date of Patent: Aug. 19, 2014

(54) METHOD FOR ROUTING DATA PACKETS USING VLANS

(75) Inventors: Michael Schlansker, Los Altos, CA (US); Jean Tourrilhes, Mountain View, CA (US); Yoshio Turner, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 12/770,978

(22) Filed: Apr. 30, 2010

(65) Prior Publication Data

US 2011/0268118 A1 Nov. 3, 2011

(51) Int. Cl.
*H04L 12/28* (2006.01)
*H04L 12/56* (2006.01)
*H04L 12/46* (2006.01)

(52) U.S. Cl.
CPC ............. *H04L 12/4641* (2013.01); *H04L 45/28* (2013.01); *H04L 45/02* (2013.01); *H04L 45/24* (2013.01)

USPC ........... 370/392; 370/216; 370/217; 370/218; 370/219; 370/220; 370/221; 370/229; 370/230; 370/231; 370/232; 370/235; 370/237; 370/395.53

(58) Field of Classification Search
None
See application file for complete search history.

(56) References Cited

U.S. PATENT DOCUMENTS

| 7,912,091 B1 * | 3/2011 | Krishnan et al. ............... 370/490 |
| 2002/0147800 A1 * | 10/2002 | Gai et al. ....................... 709/221 |
| 2009/0304007 A1 * | 12/2009 | Tanaka et al. ............ 370/395.53 |

* cited by examiner

*Primary Examiner* — Hassan Phillips
*Assistant Examiner* — Lonnie Sweet

(57) ABSTRACT

In a method for routing packets between a plurality of switches in a computer network, in which paths between the plurality of switches are identified as a plurality of virtual local area networks (VLANs) stored in a balancing table, a packet to be routed from a source switch to a destination switch is received. In addition, a VLAN is selected from the plurality of VLANs in the balancing table to route the packet through the computer network and the packet is routed through the selected VLAN.

14 Claims, 9 Drawing Sheets

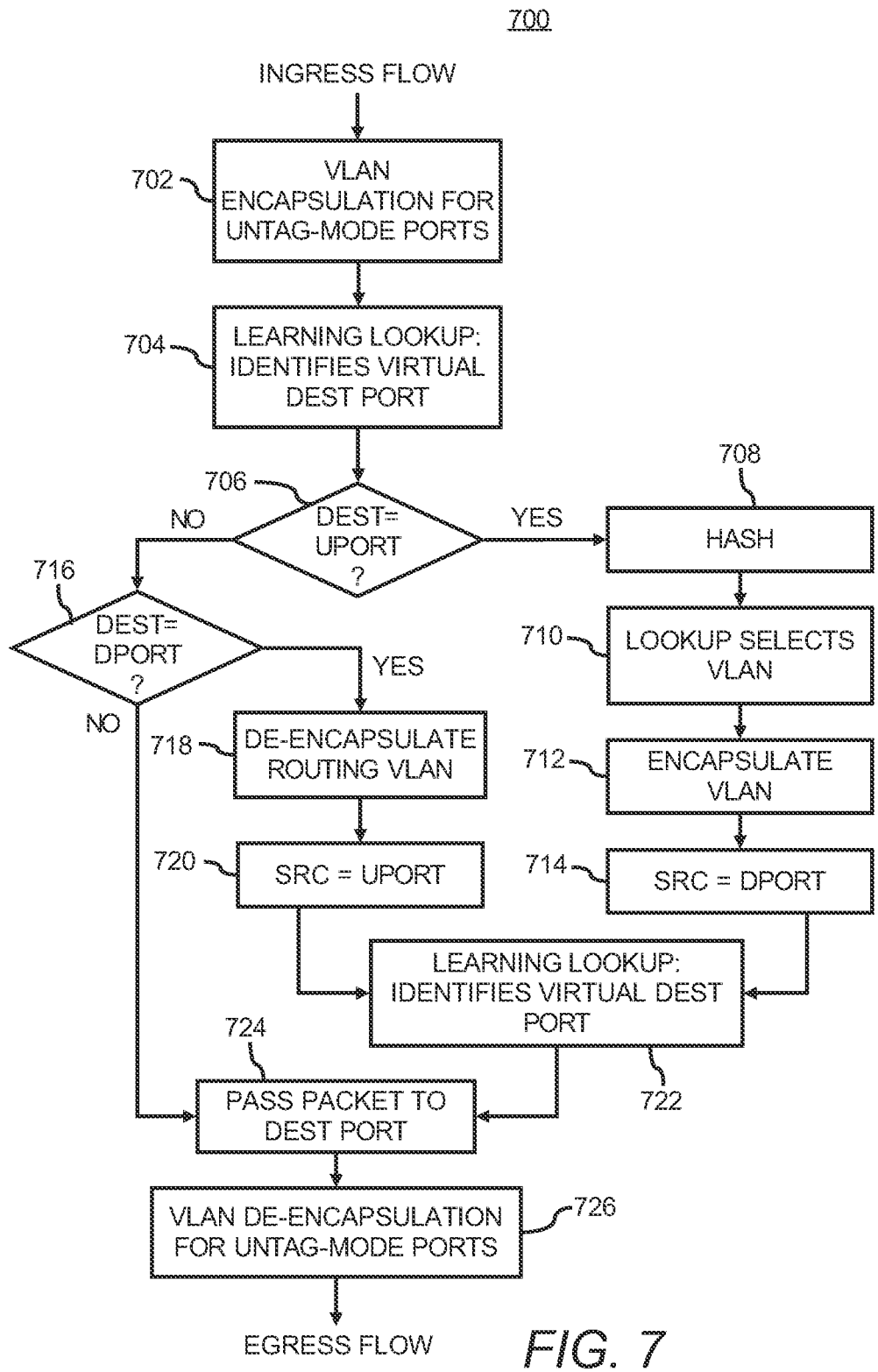

METHOD FOR ROUTING DATA PACKETS USING VLANS

RELATED APPLICATION

The present application contains some common subject matter with U.S. Patent Application Ser. No. PCT/US2010/33258 entitled "METHOD FOR ROUTING DATA PACKETS IN A FAT TREE NETWORK", filed on Apr. 30, 2010 by Michael Schlansker, Jean Tourrilhes, and Yoshio Turner, the disclosure of which is incorporated by reference in its entirety.

BACKGROUND

Ethernet switching technology provides high bandwidth, low latency, and scalability for large datacenters and computers for data communication. A number of approaches have been used to exploit multiple paths in an Ethernet. For example, the network can be partitioned using layer-three Internet Protocol (IP) subnets or layer-two Virtual Local Area Networks (VLANs). Although these approaches limit the scope of flat layer two networks and assist in exploiting multiple paths, complex and costly manual administration are still required.

Another protocol developed to enhance Ethernet networks is hash-based routing based on fat trees. Fat trees are constructed in tiers to allow switches of fixed radix to scale to networks of arbitrary size and bisection bandwidth. When a message flows from a source to a destination, a sequence of multiple uplink choices are confronted until a root switch is reached. These techniques provide load balancing for multi-path networks while preserving the simple administration of plug and play networks, which results from the learning functions of transparent bridging. However, a critical problem for hash-based routing occurs when one or more links or switches fail, which disrupts normal network communications. Unlike a regular tree, which includes only a single top switch, the fat-tree structure includes a larger number of uplinks and top switches. Therefore, the probability of failure in the fat-tree structure is increased. Another problem with hash-based routing based on fat trees is that it is limited to fat tree topologies. In this regard, hash-based routing based on fat trees are not applicable in many other topologies, such a meshes, cliques, and Hyper-X topologies.

BRIEF DESCRIPTION OF THE DRAWINGS

Features of the present invention will become apparent to those skilled in the art from the following description with reference to the figures, in which:

FIG. 7 illustrates a flow diagram of a method for routing packets between a variety of dual learn switches in a meshing network, such as the meshing network depicted in FIG. 6A, according to an example embodiment of the present invention.

DETAILED DESCRIPTION

Figure 1:
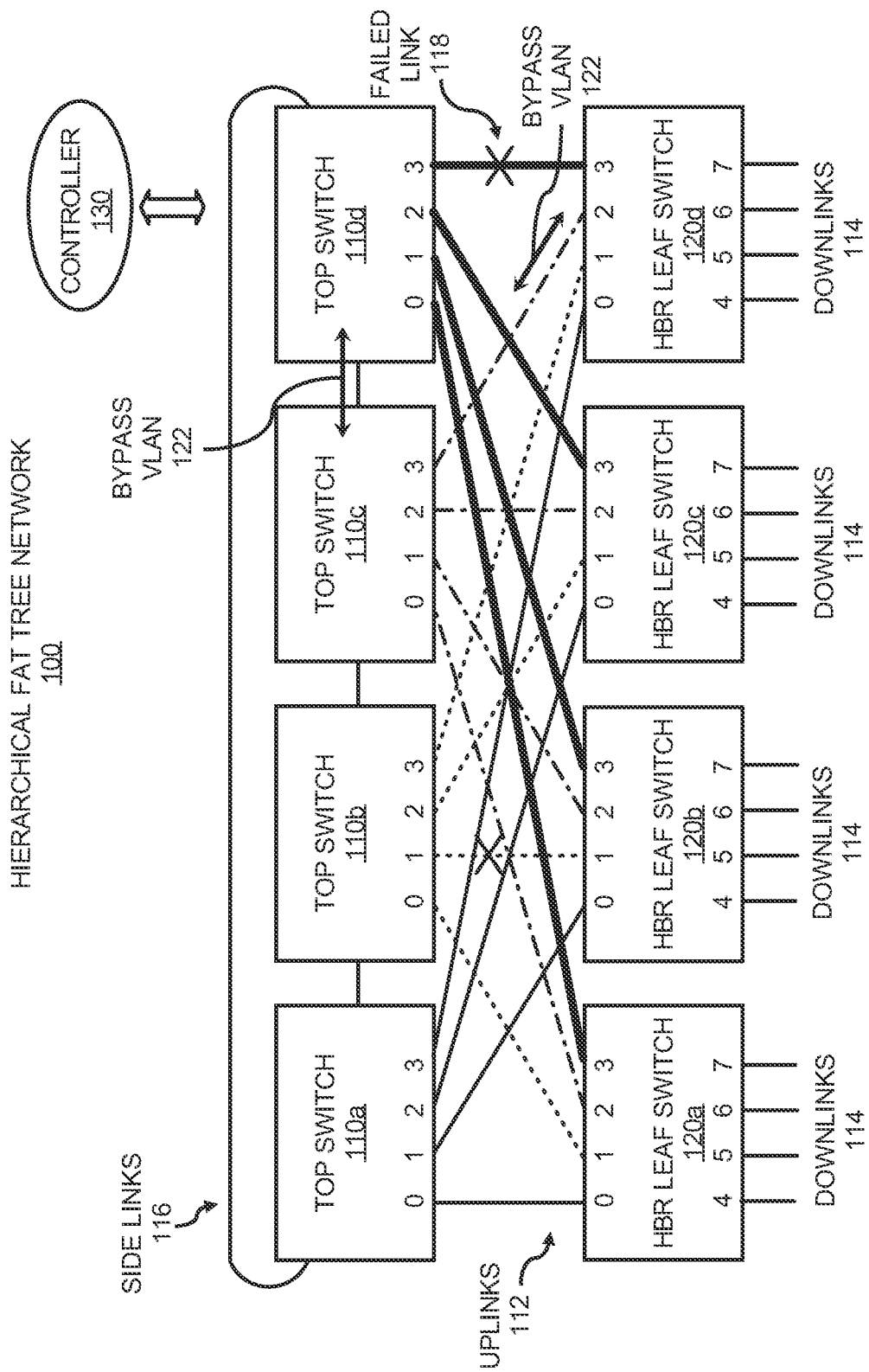
FIG. 1 shows a diagram of a hierarchical fat tree network, according to an example embodiment of the present invention.

For simplicity and illustrative purposes, the present invention is described by referring mainly to an example embodiment thereof. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are methods for routing packets between a plurality of switches in a computer network, wherein paths between the plurality of switches are identified as a plurality of virtual local area networks (VLANs) stored in a balancing table. The computer network may comprise, for instance, a fat tree network, direct connect fabrics, meshing fabrics, etc. In addition, the balancing table may comprise a ternary content addressable memory (TCAM) table.

In a first embodiment, the methods disclosed herein are configured to select an appropriate VLAN from the balancing table to route a packet through the computer networks in response to a determination that the packet is to be routed through at least one port connected to a broken link in the computer network. In one regard, the VLAN is selected to avoid one or more of the ports connected to the broken link, to thus ensure that the packet is delivered to the destination switch. In addition, the selection of the VLAN from the balancing table may be based upon satisfaction of one or more active load balancing protocols. For instance, the selected VLAN may comprise a VLAN that enables load to be balanced among the switches.

Through implementation of the methods disclosed herein, a failed link between the top switches and the leaf switches may automatically be determined. The method and controller disclosed herein enable all remaining operational links and switches to carry traffic without unnecessarily disabling any top or leaf switch. As such, the method and controller disclosed herein enable for a packet route having a failed uplink to be tolerated in a relatively quick and efficient manner using the VLANs.

In a second embodiment, the methods disclosed herein are configured to use the routing VLANs to control packet traffic flow through relatively complex computer networks, such as, direct connect fabrics, meshing networks, etc. In this embodiment, the switches comprise either single learn hash based routing (HBR) switches or dual learn HBR switches. In one regard, the methods disclosed herein allow for computer networks to have relatively complex constructions by providing flexible control over the network fabric topology.

As discussed herein, a packet may be a data packet and a stream of data packets carries information needed for communication flows that transport information streams over a network between sending and receiving devices. Examples of types of packet streams are multiplayer game data, streaming video or audio, or bulk transfer of data. The source and destination devices are configured to send or receive packets via a route in a network and packets may pass through the route to the destination device through the network or through another network.

According to an embodiment, one end of an uplink is connected to a top switch and the other end of the uplink is connected to a leaf switch in a fat tree network. More than one uplink may be connected to a top switch and a leaf switch. One or more down links may also be connected to a leaf switch in a fat tree network. Multilayer switches in a fat tree network deploy memory tables using specialized memory architectures, such as a balancing table. A particular example of a suitable balancing is a ternary content addressable memory (TCAM) table, which is an example of a hash-based routing (HBR) table to distribute traffic across the top switches.

A hash function assigns messages to randomly selected hash classes. For each source address "s" and each destination address "d," H(s, d) represents the hash class for every message sent from s to d. This hash may incorporate layer two and higher layer information. Symmetric hashes have H(s,d)=H(d,s). This ensures that the path may be retraced by a reply after a message flows from a source to any destination.

The methods described herein are not limited to be applied only to a fat tree network. The methods may also be applied to other wired or wireless networks, such as wired or wireless telecommunications networks, computer networks, or other types of networks. The methods disclosed herein may further be applied to relatively complex networks, such as, direct connect fabrics, meshing fabrics, etc.

With reference first to FIG. 1, there is shown a diagram of a hierarchical fat tree network 100 having virtual local area networks (VLANS) for routing packets, according to an example. It should be clearly understood that the fat tree network 100 may include additional components and that some of the components described herein may be removed and/or modified without departing from a scope of the fat tree network. As such, the fat tree network 100 may include any number of top switches, leaf switches, uplinks, downlinks, source devices, and network devices. In addition, the fat tree network 100 may be connected to an access network or any wide area network (WAN) or other network.

The hierarchical fat tree network 100 includes multiple top switches 110a-110d and multiple hash based routing (HBR) leaf switches 120a-120d. The hierarchical fat tree network 100 also includes multiple uplinks 112 between the top switches 110a-110d and the leaf switches 120a-120d. In one embodiment, one of the top switches 110a may be used for a spanning tree that interconnects the leaf switches 120a-120d. This spanning tree is adequate to support the addition or reconfiguration of additional Ethernet switches that may be attached to the leaf switches 120a-120d. The remaining top switches may not participate in the spanning tree protocol but may provide additional redundant paths that may be used by hash-based routing to transport packets. In another embodiment, if the top switch 110a that supports the spanning tree protocol fails, a new spanning tree may be determined starting from another top switch among the remaining top switches.

In a further embodiment, a special VLAN is selected as a unique control VLAN. In this embodiment, all of the ports are enabled on all of the switches for the control VLAN. One or more preferred top switches are given the highest spanning tree priority to help direct tree formation. In addition, spanning tree is initiated, within the control VLAN, to block ports and eliminate cycles. At this time, the network may be observed and controlled through the control VLAN and the control VLAN may be used to support broadcast traffic.

The fat tree network 100 further includes multiple downlinks 114, which are connected to the leaf switches 120a-120d as shown in FIG. 1. In addition, a controller 130, which may comprise a data center wide network controller or a more localized network controller, is configured to load balance the routing of packets between the top switches 110a-110d and the leaf switches 120a-120d through application of hash-based routing tables. As discussed in greater detail herein below, the controller 130 is configured to detect a failed link, to select a VLAN and route packets between the top switches 110a-110d and the leaf switches 120a-120d via the selected VLAN.

In addition, the hierarchical fat tree network 100 includes side links 116 that directly interconnect the top switches 110a-110d to each other without requiring that packets travel through the HBR leaf switches 120a-120d. In one embodiment, the side links 116 are disabled when none of the uplinks 112 have been determined to have failed.

In the example of FIG. 1, there are shown four different VLANs, which are distinguished from each other by different types of lines, including a regular line, a dotted line, a semi-dotted line, and a thick line. In the hierarchical fat tree network 100, hash-based routing is applied in determining which of the routing VLANs are selected for communication of packets between the HBR leaf switches 120a-120d. In a particular embodiment, links 118 between some of the top switches 110a-110d and the HBR leaf switches 120a-120d have been denoted with an "X" to indicate that these links have failed or are broken. A link may fail, for instance, if a port on either the top switch 110a or the HBR leaf switch 120a fails or when the top switch 110a or the HBR leaf switch 120a fails entirely. In addition, or alternatively, a link may fail if a cable connecting the ports of the top switch 110a and the HBR leaf switch 120a becomes damaged or disconnected.

Any of the uplinks may be a physical link or a link aggregation group (LAG). For example, in FIG. 1, any of the uplinks 112 may be a physical link, or a LAG composed of two or more physical links connecting the same pair of switches. If an uplink 112 is a LAG, the uplink 112 is considered as having failed when all of the physical links within a LAG fail. The top switch 110a that is directly attached to the failed link is considered as a failed top switch. In addition, both the failed HBR leaf switch 120a and the failed top switch 110a may be fully functional except for the broken link.

As shown in FIG. 1, the network 100 includes two failed uplinks 118, which have been marked with an "X". The first failed uplink 118 is between port 3 of the rightmost top switch 110d and port 3 of the rightmost HBR leaf switch 120d. The second failed uplink 118 is between port 1 of the second top switch 110b and port 1 of the second HBR leaf switch 120b. The first failed uplink 118 prevents packets to be routed through port 3 of the HBR leaf switch 120d. According to an embodiment, the controller 130 is configured to select a bypass VLAN 122, for instance, as denoted by the arrows traversing the path from port 2 of the HBR leaf switch 120d to the third top switch 110c and onto the fourth top switch 110d. The controller 130 is configured to select a bypass VLAN 122 from a plurality of VLANs, for instance, as represented by the different types of lines indicating the uplinks 112 in FIG. 1, which are stored in a balancing table to bypass the port connected to the broken link. The controller 130 may select the routing VLAN for the packet based upon, for instance, the bypass VLAN that requires the shortest path to the destination HBR leaf switch 120a-120c, according to an active load balancing protocol, etc.

As shown in FIG. 1, all of the VLANs of the top switch 110d, which have been represented as think lines, have no cycles and connects to each of the HBR leaf switches 120a-120d. Thus, the VLANs of the top switch 110d serve as an acyclic Ethernet network that interconnects all of the downlinks 114. In this regard, packet traffic that originates on downlinks 114 that attach to the HBR leaf switch 120d and are directed to port 2 of the HBR leaf switch 120d may reach any remote downlink 114 destination.

Figure 2:
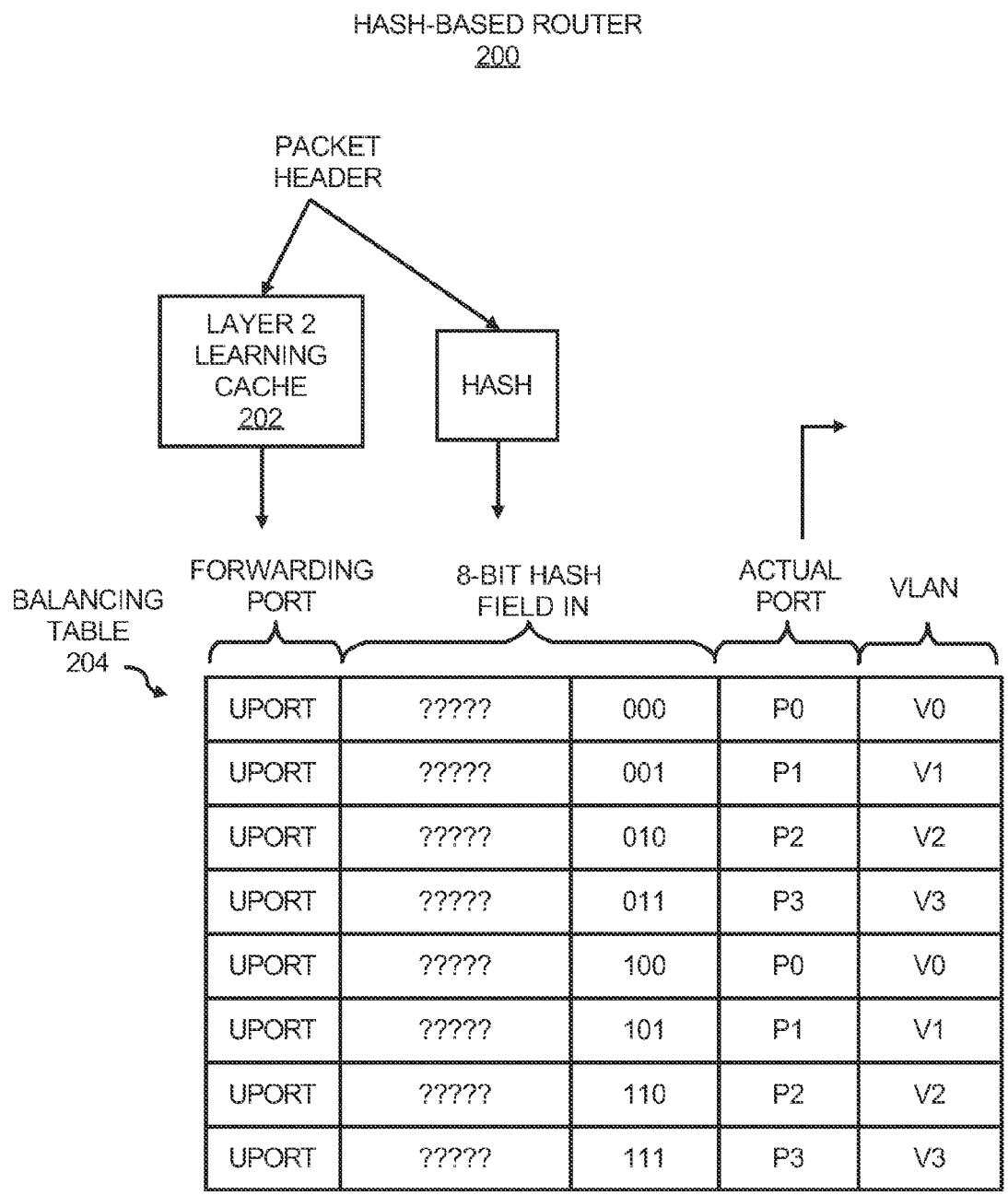
FIG. 2 shows a hash-based router for use in a fat tree network, for instance, the hierarchical fat tree network depicted in FIG. 1, according to an example embodiment of the present invention.

With reference now to FIG. 2, there is shown a hash-based router 200 for use in a fat tree network, for instance, the hierarchical fat tree network 100 depicted in FIG. 1, according to an example. It should be clearly understood that the hash-based router 200 may include additional components and that some of the components described herein may be removed and/or modified without departing from a scope of the hash-based router 200.

Generally speaking, the controller 130 (FIG. 1) is configured to employ the hash-based router 200 in actively managing the routing of packets through the fat tree network 100 for balancing load among a number of the top switches 110a-110d. In other words, the controller 130 is configured to access a balancing table 204 to route packets through the top switches 110a-110d in various manners to substantially prevent any one of the top switches 110a-110d from being overloaded and thereby decreasing the efficiency of the fat tree network 100. In addition, the controller 130 is configured to select VLANs from the balancing table 204 as discussed below to substantially maintain load balancing among the top switches 110a-110n that remain active, for instance, following detection of one or more failed links 118.

Each entry in the balancing table 204 contains a hash value field, a forwarding port field, an actual port field, and a VLAN field. If the hash value and forwarding port fields match corresponding key fields, then the actual port field is substituted and determines the VLAN. The Uports are discussed in detail below with respect to FIG. 3. For each possible combination of hash bits (e.g., 256 combinations for an 8-bit hash field), there is one entry containing that constant in its hash value field. Each entry also provides an actual port field that specifies the desired VLAN for the entry's hash value.

In accordance with the example shown in FIG. 1, the controller 130 uses the hash-based router 200 shown in FIG. 2 to route packets across the four top switches 110a-110d prior to detection of any faults, when the fat tree network 100 contains no broken links. Symmetric routing tables have the property that, for a bidirectional communication flow, a single network path is traversed for outbound and reply traffic from each communication. For symmetric routing, a symmetric hashing function is used that maps traffic from each bidirectional communication into a single hash class. In this example, a symmetric routing is assumed and, thus all of the switches 110a-110d and 120a-120d use the same balancing table 204. This guarantees that outbound and reply traffic from each communication traverse the same VLAN and thus reply traffic retraces the outbound path. However, the present invention should not be construed as being restricted to such symmetric communications.

In FIG. 2, the Layer 2 learning cache 202 in each switch contains an association between Ethernet addresses and the desired forwarding port for that address. For uplinks, the Layer 2 learning cache 202 specifies the uplink virtual port indicating that one of the uplinks will be used to send the data through a top switch according to the result of a balancing table 204 construction. In one embodiment, the balancing table 204 entries may be created to substantially uniformly distribute traffic across the four VLANs marked V0, V1, V2, and V3 and ports P0, P1, P2, and P3 out of each leaf switch 120a-120d. Uplinks 112 having the same marking on each leaf switch reach the same top switch. Each packet's hash value and direct packets having specific hash values are matched to specific uplinks. For example, 8 bits of hash result may be calculated. However, the balancing table 204 entries may ignore 5 bits of hash result and match three low-order bits of the hash result with binary values: 000, 001, 010, 011, 100, 101, 110, and 111.

In one embodiment, a match operation selects the output port and the VLAN that is used to transport a packet. For instance, eight hash classes may be mapped on the four uplinks in such a way that exactly two hash classes are mapped on every uplink. This hash mapping is symmetric, and identical hash-based routing tables are installed in every leaf switch 120a-120d.

Figure 3:
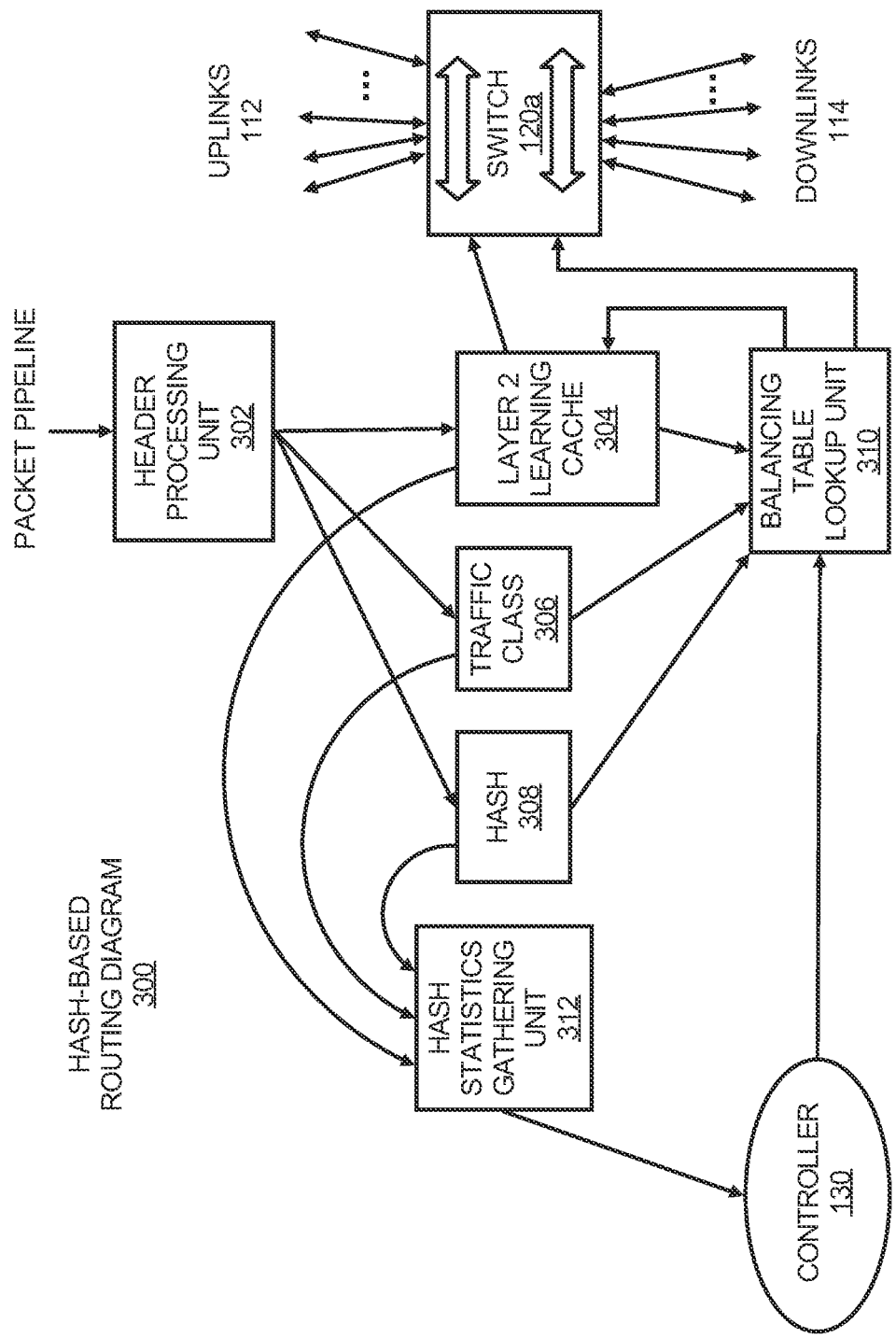
FIG. 3 shows a process diagram illustrating a hash-based routing (HBR) operation performed in a HBR leaf switch, according to an example embodiment of the present invention.

With reference now to FIG. 3, there is shown a process diagram 300 illustrating a hash-based routing (HBR) operation performed in a HBR leaf switch 120a, according to an example. It should be clearly understood that the HBR switch 120a may include additional components and that some of the components described herein may be removed and/or modified without departing from a scope of the HBR switch 120a.

As shown in FIG. 3, the HBR leaf switch 120a includes a header processing unit 302, a balancing table lookup unit 310, and a hash statistics gathering unit 312. The header processing unit 302 is configured to receive packets from a packet pipeline, which includes the uplinks 112 and the downlinks 114. In addition, for a received packet, the header processing unit 302 is configured to process the header information contained in the packet header to extract three key pieces of information. The information includes a Layer two learning information 304, a traffic class 306, and a hash 308 of the packet. The Layer two information includes the source media access control (MAC) address, the destination MAC address, and the VLAN, which may be used in the Layer two learning cache 304. The result of a successful learning lookup is a virtual destination port for the received packet. The traffic class 306 provides a lookup key needed to segregate traffic, which may include the Ethertype (e.g. FCoE) as well as the VLAN tag, which may identify client traffic classes that deserve special treatment. The header processing unit 302 may include a hash unit 308 that performs a symmetric hash on packet source and destination information. In addition, the hash unit may operate to map packets within a single flow to a single hash value and packets from both directions in a bidirectional flow to the same hash value, which preserves packet ordering and simplifies network-wide learning.

The layer two learning cache 304 performs a learning operation on each packet's source address as well as a lookup operation on each packet's destination address. Both operations are performed within an appropriate VLAN. A successful lookup returns a virtual port that may indicate a unique physical port, a Link Aggregation Group (LAG), or special logical ports (e.g., Uport and Dport) that are used for internal processing. For single learn switch operations, the result of a lookup hit is a virtual port that specifies either a single downlink (or downlink LAG) or a special virtual uplink known as the Uport. The Uport result indicates that the destination address is reached through one of the uplinks (i.e., not on a downlink of this leaf switch). The Dport designation indicates that the destination address is reached through one of the downlinks (i.e., not on an uplink of this leaf switch). For hierarchical networks used with single learn switches, all uplinks reach every end station and the uplink choice does not determine whether the destination is reached. Within the learning cache, uplinks are treated as a single virtual port similar to a LAG. Ingress packets arriving on all uplinks are marked as arriving on the source "Uport" before the learning action is performed, as described in greater detail herein below.

The balancing table lookup unit 310 performs low level traffic management actions. Balancing table entries may be set by the controller 130 in order to control the detail flow of packets across the fabric. The balancing table lookup key includes a traffic class that allows specialized per class traffic treatment and a hash class that allows path diverse dynamic load balancing within a traffic class. The balancing table lookup unit 310 matches against both traffic class and hash class inputs in selecting the VLAN for a packet. A balancing table match produces a result that includes the chosen physical uplink (or uplink LAG) as well as a VLAN tag specifying the selected routing VLAN, as shown in FIG. 2 above. For packets that emerge from learning with the "Uport" as the virtual destination, a substitution is performed that inserts the matching balancing table result for both the chosen port and the chosen VLAN. The packet is encapsulated in the chosen routing VLAN and sent to the chosen port in the HBR leaf switch 120a. The number of balancing table entries needed for HBR management is estimated as the number of traffic classes times the number of hash class entries per traffic class. Within each class, additional hash class entries provide finer grained traffic management. For example, 1024 balancing table entries may be used to manage sixteen distinct traffic classes in fractional traffic increments of 1 part in 64. In one regard, the balancing table lookup unit 310 allows substantial management flexibility and traffic classes need not be managed with equal granularity.

The controller 130 may collect switch statistics from the hash statistics gathering unit 312 to acquire, for instance, datacenter-wide measurements for load balancing. To implement management controls, the controller 130 sends commands to set balancing table entries directly to the HBR leaf switch 120a. The HBR leaf switch 120a interprets control messages, which allows for external control over balancing table contents. In addition or alternatively, all of the working network components may be audited using automated software implemented on top of existing Ethernet protocols, such as, Link layer discovery. Alternatively, the auditing may be provided by a database that describes the fabric that is updated by a human operator, which requires that the database be kept in harmony with the fabric topology.

Figure 4:
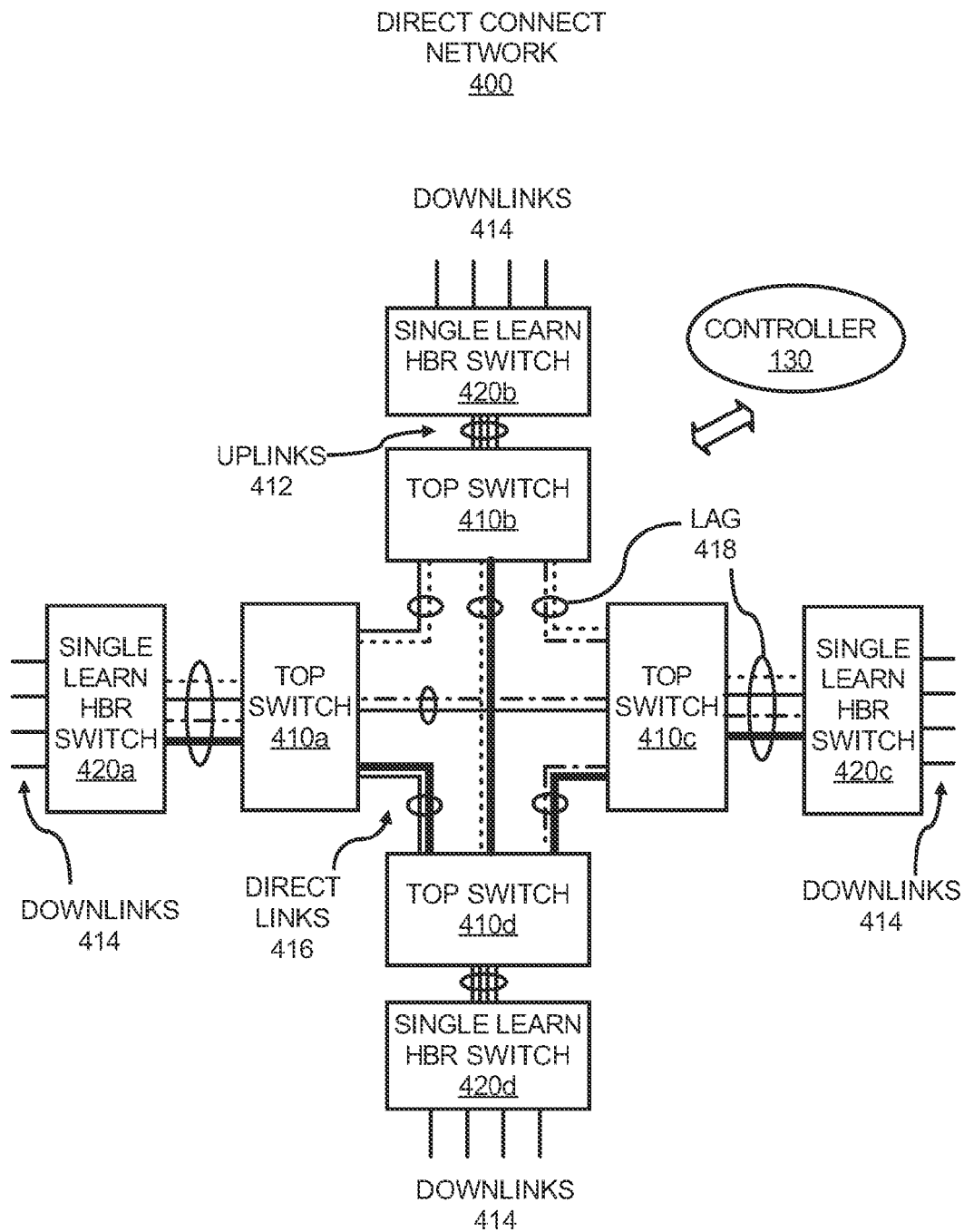
FIG. 4 shows a direct connect network containing top switches connected in a clique, according to an example embodiment of the present invention.

With particular reference now to FIG. 4, there is shown a direct connect network 400 containing top switches connected in a clique, according to an example. It should be apparent to those of ordinary skill in the art that the network 400 represents a generalized illustration and that other components may be added or existing components may be removed, modified or rearranged without departing from a scope of the network 400. As such, the direct connect network 400 may include any number of top switches, leaf switches, uplinks, downlinks, source devices, and network devices.

As shown in FIG. 4, the direct connect network 400 includes multiple top switches 410a-410d and multiple single learn HBR switches 420a-420d. The direct connect network 400 also includes multiple uplinks 412 between respective ones of the HBR leaf switches 420a-420d and the top switches 410a-410d and multiple downlinks 414 connected to the HBR leaf switches 420a-420d. In addition, each of the top switches 410a-410d is connected to each of the other top switches 410a-410d through direct links 416. The direct connect network 400 retains a hierarchical structure and combines an outer ring of HBR leaf switches 420a-420d along with an inner ring of top switches 410a-410d. In addition, the ovals depicted in FIG. 4 represent respective link aggregation groups (LAGs) 418, which are composed of one or more physical links that carry multiple VLANs.

In the example of FIG. 4, there are shown different VLANs, which are distinguished from each other by different types of lines, including a regular line, a dotted line, a semi-dotted line, and a thick line. In the direct connect network 400, hash-based routing is applied in determining which of the routing VLANs are selected for communication of packets between the HBR leaf switches 420a-420d. The VLANs have been programmed to provide a portfolio of routing choices with adequate path diversity. Since every VLAN reaches all of the end downlinks 414, any arbitrary VLAN may be selected to deliver traffic among the HBR leaf switches 420a-420d.

The direct connect network 400 is often desired over the hierarchical fat tree networks because they may eliminate extra switch traversals (or hops) as data can move directly from an ingress switch to an egress switch without traversing an intermediate top switch. The HBR leaf switches 420a-420d comprise single learn HBR switches because the HBR leaf switches 420a-420d perform a single Ethernet learning operation on each packet. In addition, the single Ethernet learning operation performed by the HBR leaf switches 420a-420d identifies a virtual destination port. The top switches 410a-410d then performs a learning lookup, within the selected VLAN, that directs the packets across the routing fabric.

Figure 5:
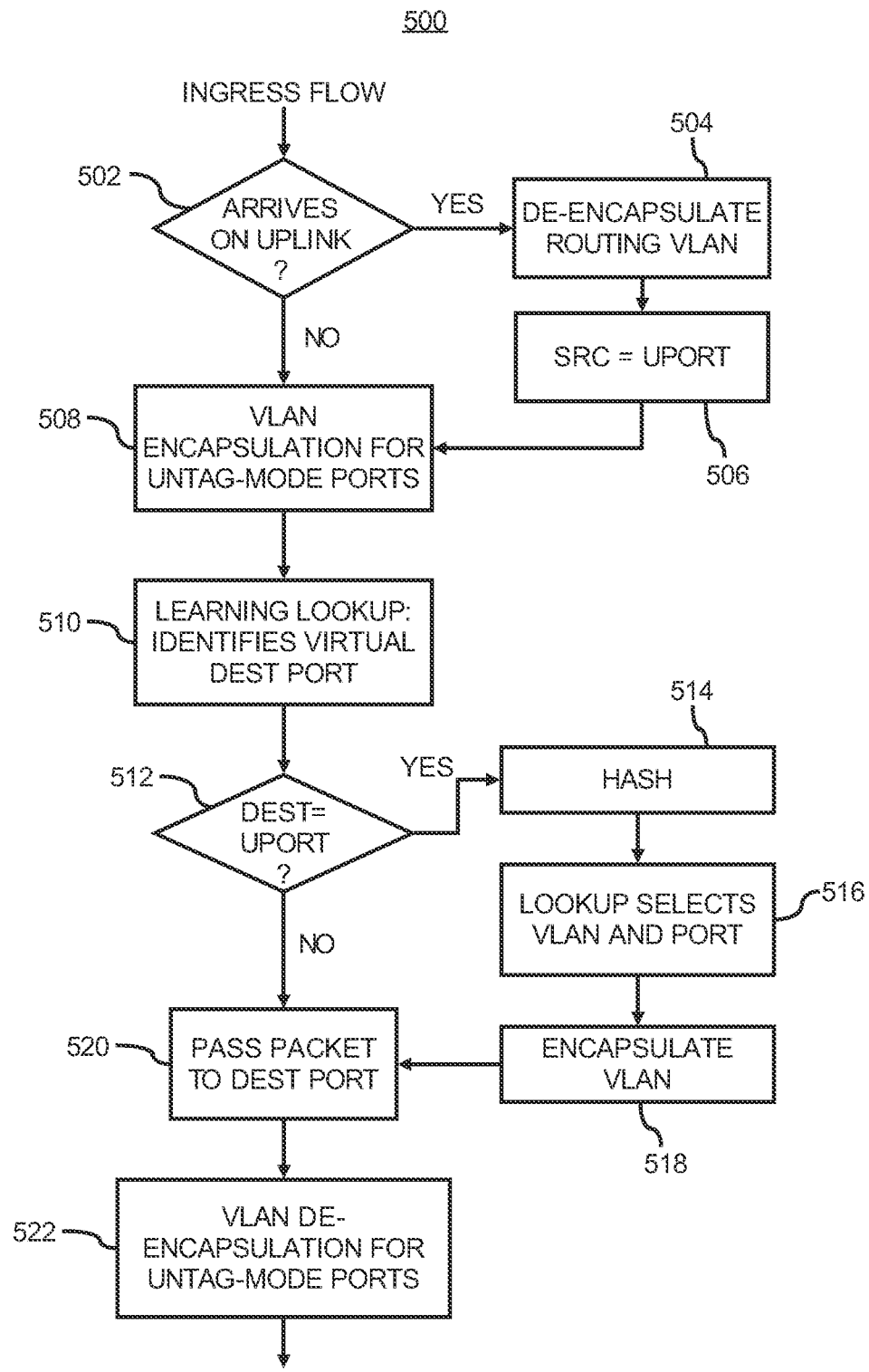
FIG. 5 a flow diagram of a method for routing packets between a variety of single learn switches in a direct connect computer network, such as the direct connect network depicted in FIG. 4, according to an example embodiment of the present invention.

Turning now to FIG. 5, there is shown a flow diagram of a method 500 for routing packets between a variety of single learn switches in a direct connect computer network, such as the direct connect network 400 depicted in FIG. 4, according to an example. It should be apparent to those of ordinary skill in the art that the method 500 represents a generalized illustration and that other steps may be added or existing steps may be removed, modified or rearranged without departing from a scope of the method 500.

At step 502, a determination as to whether a packet being received by an HBR leaf switch 420a has arrived on an uplink 412 is made. In other words, a determination as to whether the packet is received from a top switch 410a or from a downlink 414 is made at step 502. Packets received on uplinks 412 have previously been encapsulated with a routing VLAN and thus, as indicated at step 504, the routing VLAN is de-encapsulated from the packet. In addition, the source port is identified as a Uport at step 506, which indicates that the packet was received from a uplink port of the HBR leaf switch 420a.

At step 508, following either a determination that the packet has not arrived from an uplink 412 at step 502 and step 506, the packet is encapsulated with VLAN for untagged mode ports. The Uport source is treated as a tagged mode port.

At step 510, a learning lookup is performed to identify a virtual destination port as discussed above with respect to the Layer two learning cache 304 (FIG. 3). In addition, at step 512, a determination as to whether the identified virtual destination port is a Uport is made (i.e., whether the virtual destination port is an uplink port). In response to a determination that the identified virtual destination port is a Uport at step 512, the source and destination information of the packet is hashed at step 514, as discussed above with respect to the hash 308 (FIG. 3). As also discussed above with respect to FIG. 3, the balancing table lookup unit 310 uses the lookup key from the traffic class 306 to select a VLAN and destination port for the packet from a balancing table 204 (FIG. 2), as indicated at step 516. In addition, the packet is encapsulated with information pertaining to the source port and the destination port, as indicated at step 518.

At step 520, following either step 518 or a determination that the identified virtual destination port is not a Uport at step 512, the packet is passed on to the destination port via the selected VLAN and through an appropriate source port. Once the packet is passed to the output port, the VLAN is de-encapsulated from the packet for untagged-mode ports, as indicated at step 522. After this step, the packet is sent from the output port onto the link.

Figure 6A:
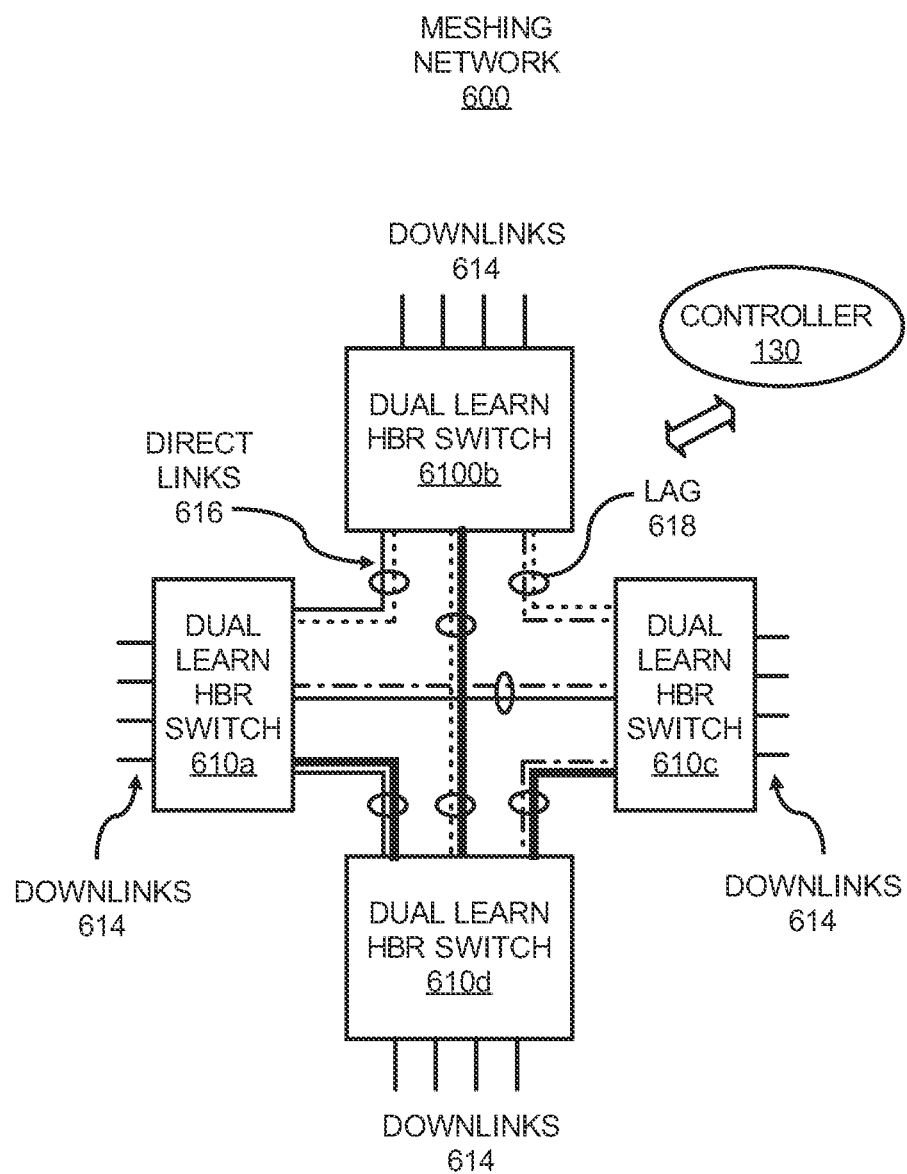
FIG. 6A illustrates a meshing network, according to an example embodiment of the present invention.

With particular reference now to FIG. 6A, there is shown a meshing network 600, according to an example. It should be apparent to those of ordinary skill in the art that the network 600 represents a generalized illustration and that other components may be added or existing components may be removed, modified or rearranged without departing from a scope of the network 600. As such, the mesh network 600 may include any number of switches.

As shown in FIG. 6A, the meshing network 600 includes a plurality of dual learn HBR switches 610a-610d, which are connected to each other through a plurality of direct links 616. In comparing the meshing network 600 with the direct connect network 400 depicted in FIG. 4, the meshing network 600 contains fewer switches and hops and the top switches 410a-410d have been combined with the leaf switches 420a-420d into the dual learn HBR switches 610a-610d. The meshing network 600 may be desired over the direct connect network because it may eliminate extra switch traversals (or hops) as data can move directly from an ingress switch to an egress switch without traversing an intermediate top switch. The dual learn HBR switches 610a-610d also include multiple downlinks 614 connected to the HBR leaf switches 610a-610d. In addition, the ovals depicted in FIG. 6A represent respective link aggregation groups (LAGs) 618, which are composed of one or more physical links that carry multiple VLANs.

In the example of FIG. 6A, there are shown different VLANs, which are distinguished from each other by different types of lines, including a regular line, a dotted line, a semi-dotted line, and a thick line. In this regard, the meshing network 600 operates in the same manner as the direct connect network 400 in FIG. 4, except that each of the HBR switches 610a-610d performs up to two learning operations on each packet. For an ingress packet that crosses the network 600, a first learning operation decides whether the inbound packet exits on another downlink 614 from the same ingress switch 610a or whether the packet must cross the fabric on a routing VLAN. For packets that cross the fabric, the packets are directed to a carefully managed VLAN choice, as discussed in greater detail herein below. In addition, a second learning operation is performed within the chosen routing VLAN to determine the correct egress port, as also discussed in greater detail herein below.

Figure 6B:
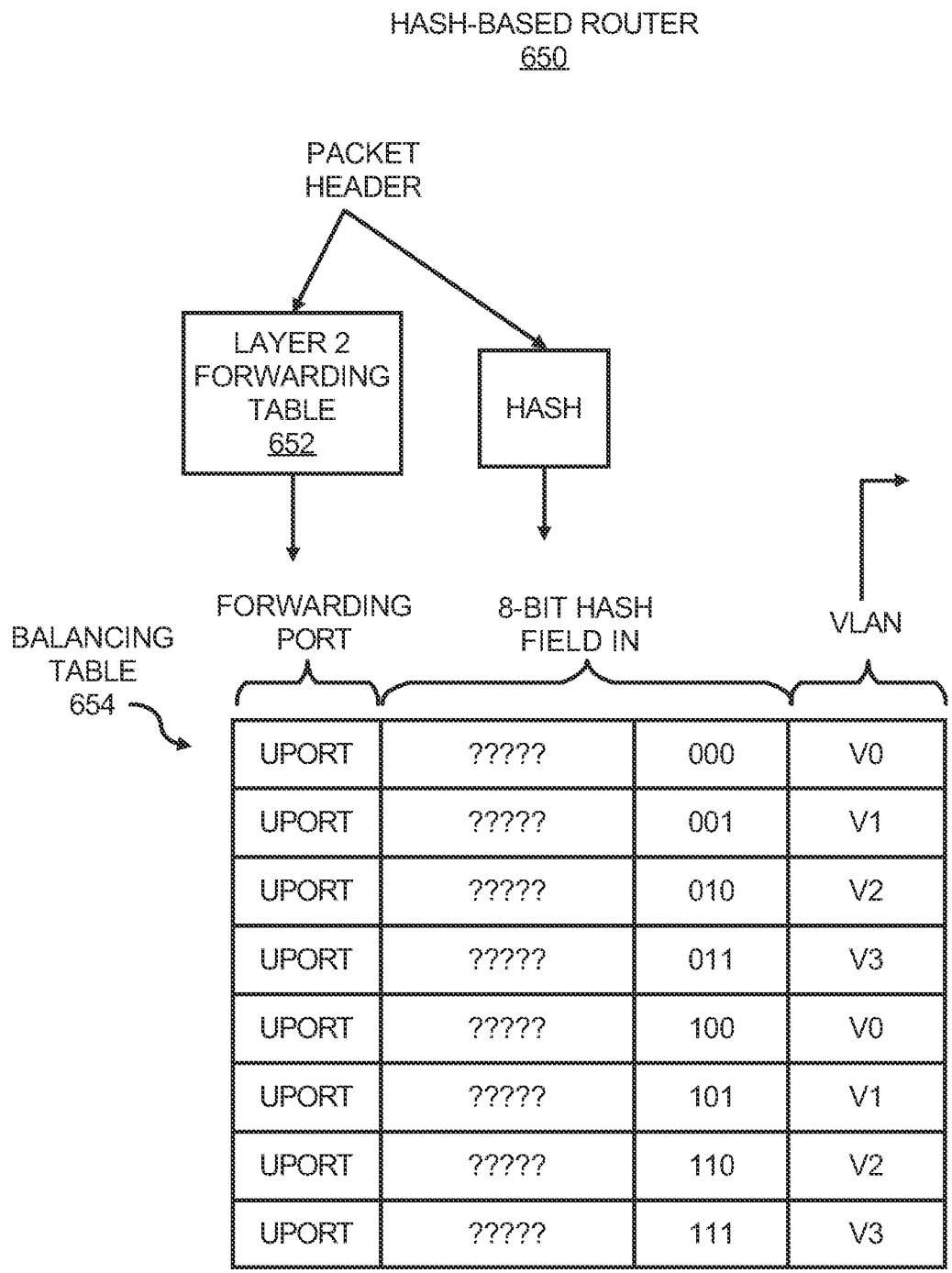
FIG. 6B shows a hash-based router for use in a computer network, such as the meshing network depicted in FIG. 6A, according to an example embodiment of the present invention.

With reference now to FIG. 6B, there is shown a hash-based router 650 for use in a computer network, such as the meshing network 600 depicted in FIG. 6A, according to an example. It should be clearly understood that the hash-based router 650 may include additional components and that some of the components described herein may be removed and/or modified without departing from a scope of the hash-based router 650.

Generally speaking, the controller 130 (FIG. 3) is configured to employ the hash-based router 650 in actively managing the routing of packets through the meshing network 600 for balancing load among a number of dual learn HBR switches 610a-610d. In other words, the controller 130 is configured to access a balancing table 654 to route packets through the switches 610a-610d in various manners to substantially prevent any one of the switches 610a-610d from being overloaded and thereby decreasing the efficiency of the network 600.

Each entry in the balancing table 654 contains a hash value field, a forwarding port field, and a VLAN field. If the hash value and forwarding port fields match corresponding key fields, then the VLAN associated with those fields is determined. For each possible combination of hash bits (e.g., 256 combinations for an 8-bit hash field), there is one entry containing that constant in its hash value field. Each entry also provides a VLAN field that specifies the desired VLAN for the entry's hash value.

In accordance with the example shown in FIG. 6A, the controller 130 uses the hash-based router 650 shown in FIG. 6B to route packets across the four switches 610a-610d. Symmetric routing tables have the property that, for a bidirectional communication flow, a single network path is traversed for outbound and reply traffic from each communication. For symmetric routing, a symmetric hashing function is used that maps traffic from each bidirectional communication into a single hash class. In this example, a symmetric routing is assumed and, thus all of the switches 610a-610d use the same balancing table 654. This guarantees that outbound and reply traffic from each communication traverse the save VLAN and thus reply traffic retraces the outbound path. However, the present invention should not be construed as being restricted to such symmetric communications.

In FIG. 6B, the Layer two forwarding table 652 in each switch contains an association between Ethernet addresses and the desired forwarding port for that address. For uplinks, the Layer two forwarding table 652 specifies the uplink virtual port indicating that one of the uplinks will be used to send the data through a switch according to the result of a balancing table 654 construction. In one embodiment, the balancing table 654 entries may be created to substantially uniformly distribute traffic across the four VLANs marked V0, V1, V2, and V3 out of each switch 610a-610d. Each packet's hash value and direct packets having specific hash values are matched to specific direct links 616. For example, 8 bits of hash result may be calculated. However, the balancing table 654 entries may ignore 5 bits of hash result and match three low-order bits of the hash result with binary values: 000, 001, 010, 011, 100, 101, 110, and 111.

In one embodiment, a match operation selects the VLAN that is used to transport a packet. For instance, eight hash classes may be mapped on the four VLANS in such a way that exactly two hash classes are mapped on every VLAN. This hash mapping is symmetric, and identical hash-based routing tables are installed in every top switch 610a-610d.

Turning now to FIG. 7, there is shown a flow diagram of a method 700 for routing packets between a variety of dual learn switches in a meshing network, such as the meshing network 600 depicted in FIG. 6A, according to an example. It should be apparent to those of ordinary skill in the art that the method 700 represents a generalized illustration and that other steps may be added or existing steps may be removed, modified or rearranged without departing from a scope of the method 700.

At step 702, a received packet is encapsulated with VLAN for untagged mode ports. In addition, at step 704, a learning lookup is performed to identify a virtual destination port as discussed above with respect to the Layer two learning cache 304 (FIG. 3). More particularly, for instance, the learning lookup at step 704 determines whether the ingress packet remains within its current VLAN and merely exits the switch. This may occur for either a packet arriving on an uplink or a downlink. For ingress packets that arrive on an uplink and are destined for an downlink, the lookup result is Dport. For ingress packets that arrive on a downlink and are destined for an uplink, the lookup result is Uport.

Moreover, at step 706, a determination as to whether the identified virtual destination port is a Uport is made. In response to a determination that the identified virtual destination port is a Uport at step 706, the source and destination information of the packet is hashed at step 708, as discussed above with respect to the hash 308 (FIG. 3). As also discussed above with respect to FIG. 3, the balancing table lookup unit 310 uses the lookup key from the traffic class 306 to select a VLAN for the packet, as indicated at step 710. In addition, the packet is encapsulated with information pertaining to the VLAN, as indicated at step 712. Moreover, at step 714, the source port is identified as the Dport. This allows the learning lookup to identify packets that are exiting from a routing VLAN as packets that have crossed the Dport.

With reference back to step 706, in response to a determination that the virtual destination port identified at step 704 is not a Uport, a determination as to whether the virtual destination port identified at step 704 is a Dport is made at step 716. In response to a determination that the identified virtual destination port is a Dport at step 716, the VLAN is de-encapsulated for untagged-mode ports, as indicated at step 718. In addition, the source port is identified as the Uport at step 720. This allows the learning lookup to identify packets that are entering a routing VLAN as packets that have crossed the Uport.

Following either of steps 714 and 720, a second learning lookup is performed to identify the virtual destination port, as indicated at step 722.

At step 724, following either step 722 or a determination that the identified virtual destination port is not a Dport at step 716, the packet is passed on to the destination port via the selected VLAN and through an appropriate source port. Once the packet is passed to the output port, the VLAN is de-encapsulated from the packet for untagged-mode ports, as indicated at step 726. After this step, the packet is sent from the output port onto the link.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage devices include conventional computer system random access memory (RAM), read-only memory (ROM), erasable programmable read-only memory (EPROM), electrically erasable programmable read-only memory (EEPROM), and magnetic or optical disks or tapes. Concrete examples of the foregoing include distribution of the programs on a compact disc read only memory (CD ROM) or via Internet download. It is therefore to be understood that any electronic device capable of executing the above-described functions may perform those functions enumerated above.

Figure 8:
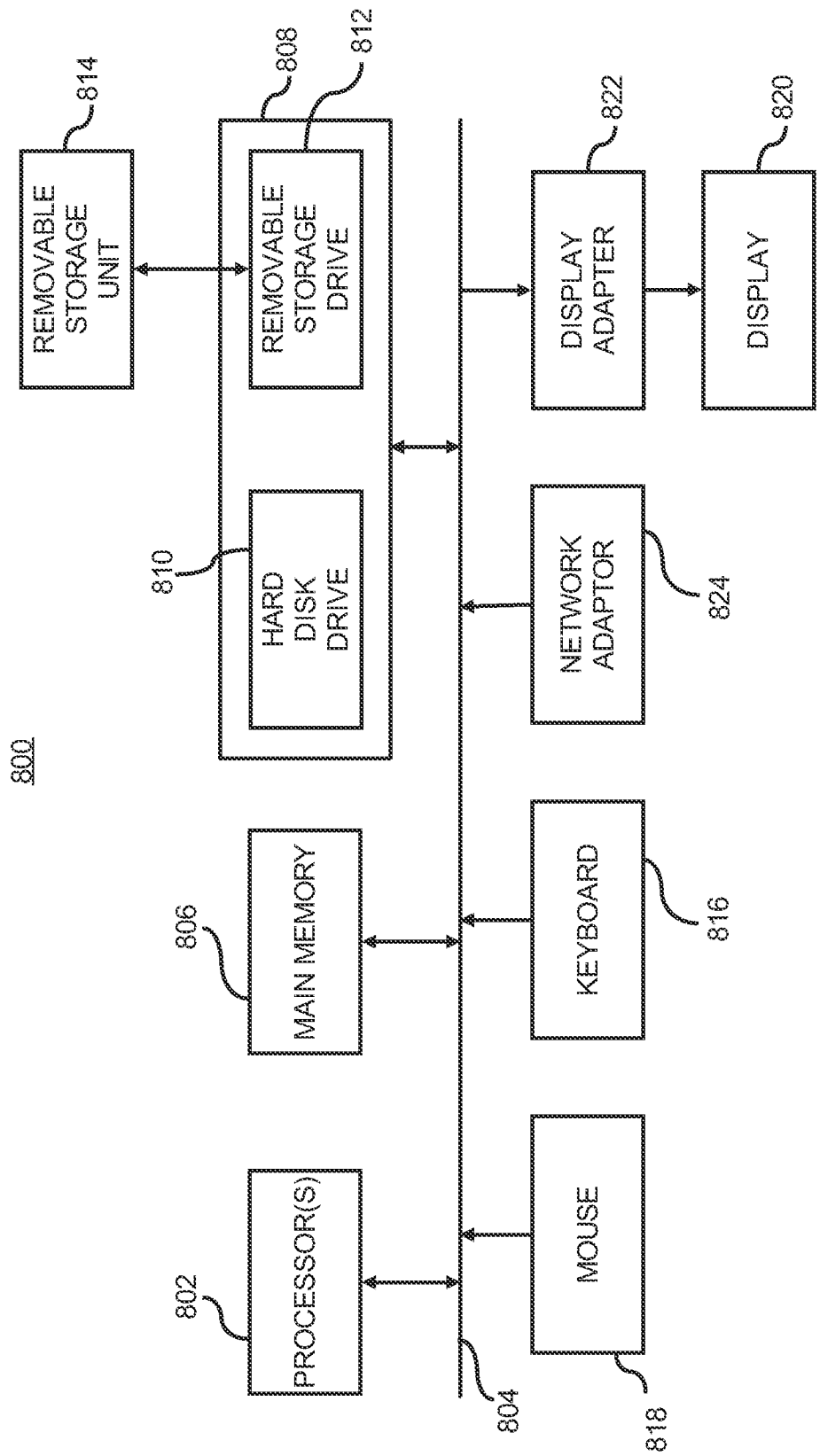
FIG. 8 shows a block diagram of a computing apparatus that may be used as a platform to implement or execute one or more of the processes depicted in FIGS. 5 and 7, according to an example embodiment of the present invention.

FIG. 8 illustrates a block diagram of a computing apparatus 800 configured to implement or execute one or more of the processes depicted in FIGS. 5 and 7, according to an embodiment. It should be understood that the illustration of the computing apparatus 800 is a generalized illustration and that the computing apparatus 800 may include additional components and that some of the components described may be removed and/or modified without departing from a scope of the computing apparatus 800.

The computing apparatus 800 includes a processor 802 that may implement or execute some or all of the steps described in one or more of the processes depicted in FIGS. 5 and 7. Commands and data from the processor 802 are communicated over a communication bus 804. The computing apparatus 800 also includes a main memory 806, such as a random access memory (RAM), where the program code for the processor 802, may be executed during runtime, and a secondary memory 808. The secondary memory 808 includes, for example, one or more hard disk drives 810 and/or a removable storage drive 812, representing a floppy diskette drive, a magnetic tape drive, a compact disk drive, etc., where a copy of the program code for one or more of the processes depicted in FIGS. 5 and 7 may be stored.

The removable storage drive 812 reads from and/or writes to a removable storage unit 814 in a well-known manner. User input and output devices may include a keyboard 816, a mouse 818, and a display 820. A display adaptor 822 may interface with the communication bus 804 and the display 820 and may receive display data from the processor 802 and convert the display data into display commands for the display 820. In addition, the processor(s) 802 may communicate over a network, for instance, the Internet, local area network (LAN), etc., through a network adaptor 824.

It will be apparent to one of ordinary skill in the art that other known electronic components may be added or substituted in the computing apparatus 800. It should also be apparent that one or more of the components depicted in FIG. 8 may be optional (for instance, user input devices, secondary memory, etc.).

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What have been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method for routing packets between a plurality of switches in a computer network, wherein paths between the plurality of switches are identified as a plurality of virtual local area networks (VLANs) stored in a balancing table, said method comprising steps performed by a processor of:
receiving a packet to be routed from a source switch to a destination switch;
selecting a VLAN from the plurality of VLANs in the balancing table to route the packet through the computer network;
routing the packet through the selected VLAN;

wherein the plurality of switches comprises a plurality of leaf switches and a plurality of top switches, wherein each of the plurality of leaf switches comprises a single learn leaf switch connected to a respective top switch through uplinks, wherein the leaf switches are configured to communicate packets to each other through top switches, and wherein the top switches are connected to each other in a clique and are able to communicate packets to each other without communicating the packets through a leaf switch, and wherein selecting the VLAN further comprises selecting a VLAN that includes communication of the packet through multiple ones of the top switches;
performing a learning lookup to identify a virtual destination port; and
determining whether the virtual destination port of the packet is a Uport prior to routing the packet through the selected VLAN.

2. The method according to claim 1, further comprising:
determining that an uplink is broken;
updating the balancing table to eliminate a VLAN containing the broken link, wherein the packet is enabled to be routed through the computer network while avoiding the broken link.

3. The method according to claim 2, wherein selecting the VLAN further comprises selecting the VLAN according to an active load balancing protocol.

4. The method according to claim 1, further comprising:
determining whether the packet was received on an uplink prior to encapsulating the packet;
in response to the packet being received on the uplink, de-encapsulating the packet from a routing VLAN; and
identifying a source port of the packet as a Uport.

5. The method according to claim 1, further comprising:
in response to the virtual destination port of the packet being a Uport,
hashing source and destination information of the packet;
selecting a routing VLAN and a routing port based upon the hash of the packet from the balancing table; and
encapsulating the packet with the selected routing VLAN.

6. The method according to claim 1, wherein the plurality of switches comprises a plurality of dual learn switches connected to each other in the form a meshing structure and wherein selecting the VLAN further comprises selecting a VLAN that includes communication of the packet directly between at least two of the dual learn switches.

7. The method according to claim 6, further comprising:
encapsulating the packet with information identifying the selected VLAN;
performing a learning lookup to identify a virtual destination port;
determining whether the virtual destination port of the packet is a Uport;
in response to the virtual destination port of the packet being a Uport,
hashing source and destination information of the packet;
selecting a routing VLAN and a routing port based upon the hash of the packet from the balancing table;
encapsulating the packet with the selected routing VLAN;
identifying the virtual source port as a Dport; and
performing a second learning lookup to identify the virtual destination port based upon the virtual source port being identified as a Dport; and wherein routing the packet through the selected VLAN further comprises routing the packet to the virtual destination port through the selected VLAN.

8. The method according to claim 7, further comprising
in response to the virtual destination port not being a Uport, determining whether the virtual destination port is a Dport;
in response to the virtual destination port being a Dport, de-encapsulating the packet from a routing VLAN;
identifying a virtual source port as a Uport; and
performing a second learning lookup to identify a virtual destination port based upon the virtual source port being identified as a Uport.

9. The method according to claim 1, further comprising:
at the destination switch, de-encapsulating the VLAN from the packet for untagged mode ports.

10. A dual learn hash based routing (HBR) switch comprising:
one or more uplinks;
one or more downlinks;
a header processing unit configured to receive, from one of the uplinks and downlinks, a packet having header information, to extract information from the packet header pertaining to Layer two learning information, traffic class, and a hash of the packet;
a balancing table lookup unit configured to select a virtual local area networks (VLAN) from a plurality of VLANS stored in a balancing table to route the packet through one of the uplinks and downlinks, wherein the selection of the VLAN is based upon the information extracted by the header processing unit;
wherein the dual learn HBR switch performs a first learning lookup to determine whether the packet exits one of the one or more downlinks of the dual learn HBR switch and a second learning lookup to identify an egress port of the dual learn HBR switch for the packet; and
wherein the dual learn HBR switch
encapsulates the packet with information identifying the selected VLAN,
performs the first learning lookup to identify a virtual destination port,
determines whether the virtual destination port of the packet is a Uport,
hashes source and destination information of the packet, in response to the virtual destination port of the packet being a Uport,
selects a routing VLAN and a routing port based upon the hash of the packet from the balancing table,
encapsulates the packet with the selected routing VLAN,
identifies the virtual source port as a Dport, and
performs the second learning lookup to identify the virtual destination port based upon the virtual source port being identified as a Dport.

11. The dual learn HBR switch according to claim 10, wherein the balancing table lookup unit is configured to select the VLAN to route the packet while avoiding a broken link in a computer network.

12. The dual learn HBR switch according to claim 10, wherein the dual learn HBR switch is further configured to, in response to a determination that the virtual destination port is not a Uport, determine whether the virtual destination port is a Dport, and in response to a determination that the virtual destination port is a Dport, de-encapsulate the packet from a routing VLAN, identify a virtual source port as a Uport, and perform the second learning lookup to identify a virtual destination port based upon the virtual source port being identified as a Uport.

13. The dual learn HBR switch according to claim 10, wherein the dual learn HBR switch is configured to accept an ingress packet within an ingress VLAN, to perform a learning action within the VLAN to determine whether the ingress packet one of remains within the ingress VLAN and transitions to one of multiple routing VLANs, to perform a routing action to determine an appropriate egress VLAN in response to a determination that the ingress packet transitions to one of the multiple routing VLANs, and performing a learning action within the egress VLAN to determine an appropriate egress port.

14. A non-transitory computer readable storage medium on which is embedded one or more computer programs, said one or more computer programs implementing a method for routing packets between a plurality of switches in a computer network, wherein paths between the plurality of switches are identified as a plurality of virtual local area networks (VLANs) stored in a balancing table, said one or more computer programs comprising a set of instructions for:

receiving a packet to be routed from a source switch to a destination switch;

selecting a VLAN from the plurality of VLANs in the balancing table to route the packet through the computer network;

wherein the plurality of switches comprises a plurality of leaf switches and a plurality of top switches, wherein each of the plurality of leaf switches comprises a single learn leaf switch to a respective top switch through uplinks, wherein the leaf switches are configured to communicate packets to each other through top switches, and wherein the top switches are connected to each other in a clique and are able to communicate packets to each other without communicating the packets through a leaf switch, and wherein selecting the VLAN further comprises selecting a VLAN that includes communication of the packet through multiple ones of the top switches;

performing a learning lookup to identify a virtual destination port;

determining whether the virtual destination port of the packet is a Uport prior to routing the packet through the selected VLAN; and routing the packet through the selected VLAN.

* * * * *

UNITED STATES PATENT AND TRADEMARK OFFICE
CERTIFICATE OF CORRECTION

PATENT NO.        : 8,811,398 B2
APPLICATION NO.   : 12/770978
DATED             : August 19, 2014
INVENTOR(S)       : Michael Schlansker et al.

Page 1 of 1

It is certified that error appears in the above-identified patent and that said Letters Patent is hereby corrected as shown below:

In the Claims

In column 13, line 47, in Claim 6, delete "form" and insert -- form of --, therefor.

Signed and Sealed this
Second Day of December, 2014

Michelle K. Lee
*Deputy Director of the United States Patent and Trademark Office*